Figure 1:
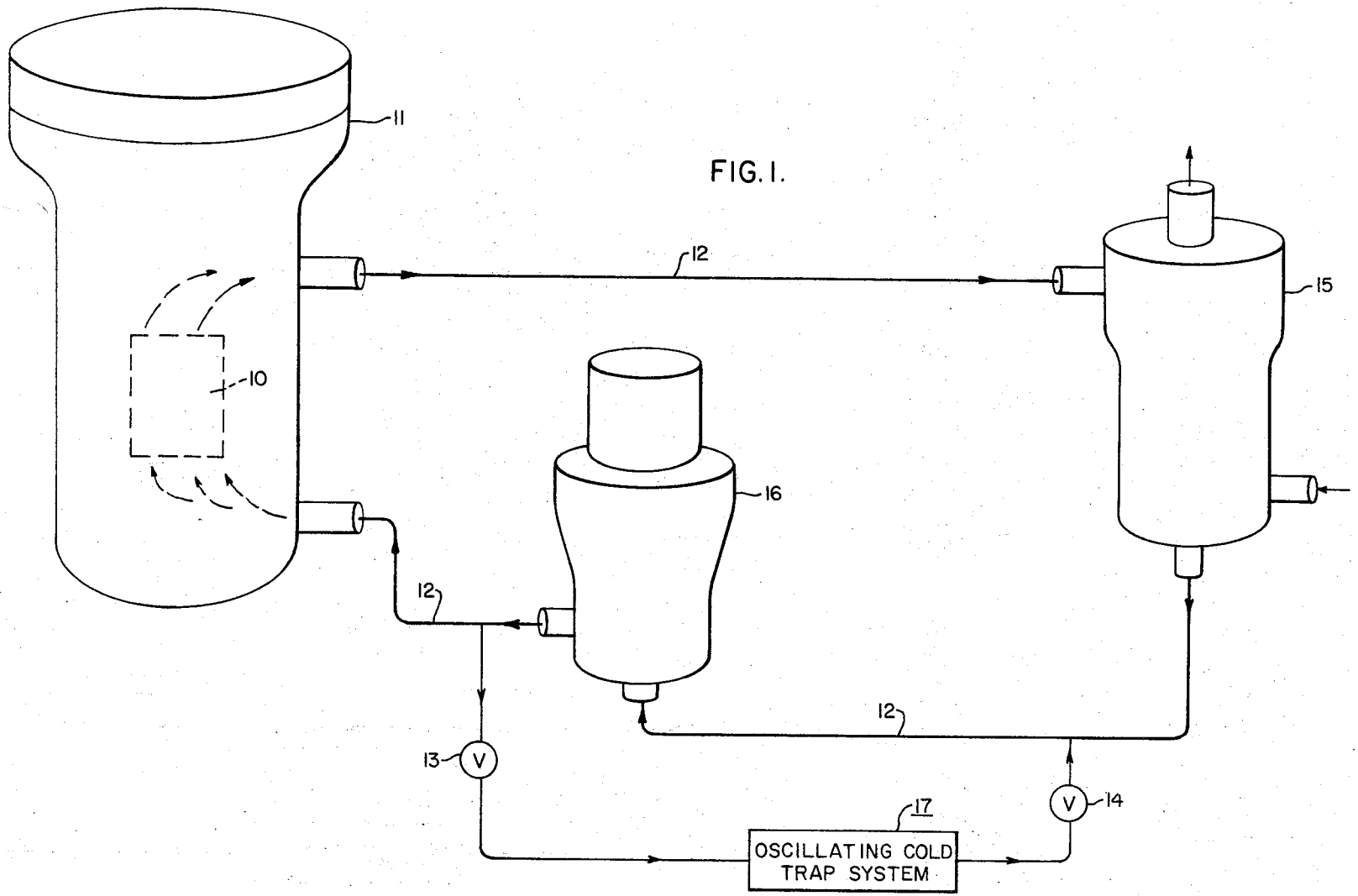
Figure 2:
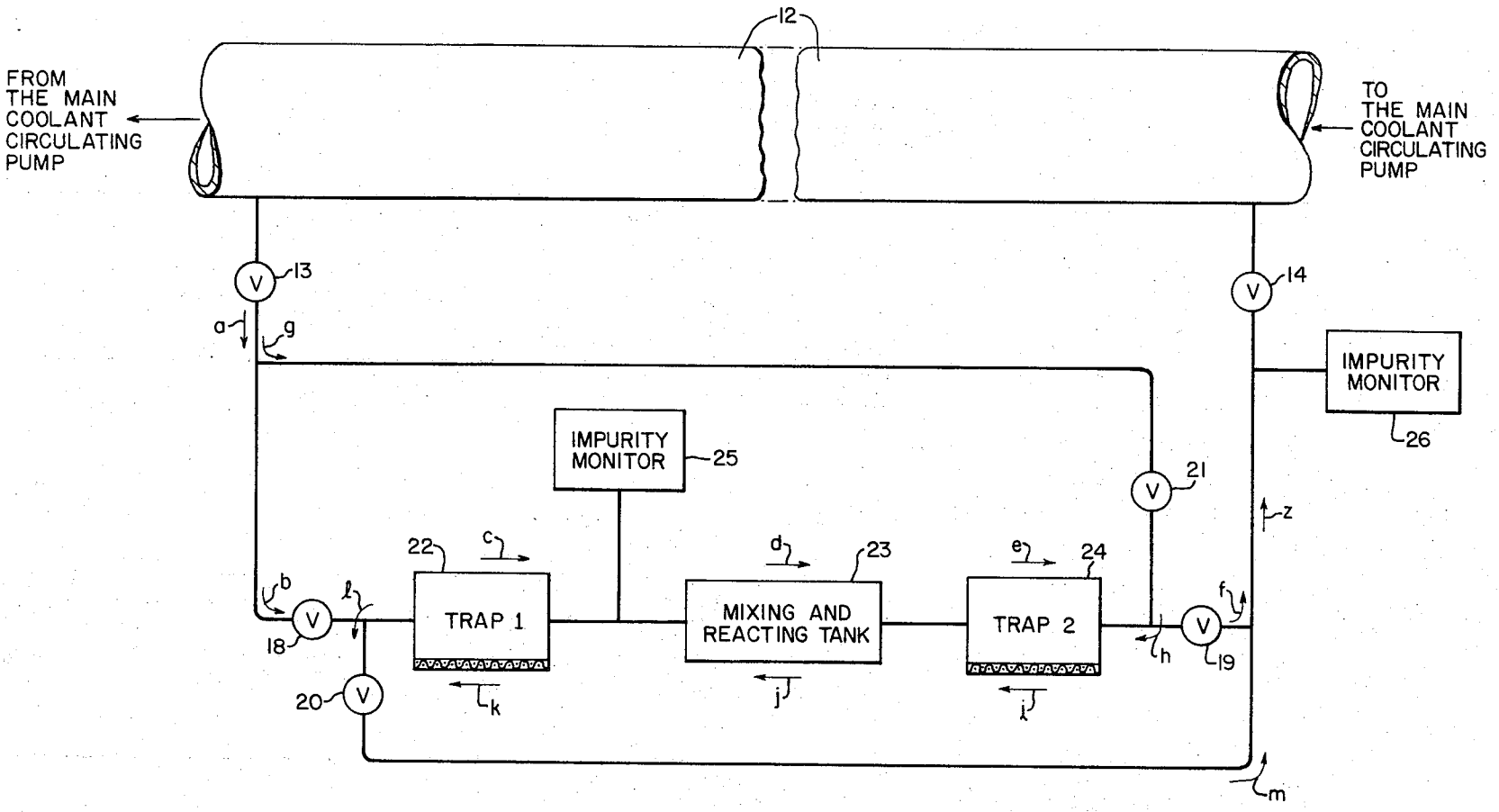

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 867

T921,016

REMOVAL OF RADIOACTIVE CONTAMINATION FROM A NUCLEAR REACTOR COOLANT

Martin H. Cooper, Monroeville, Pa., assignor to Westinghouse Electric Corporation, Pittsburgh, Pa.

Filed Sept. 28, 1972, Ser. No. 293,238

Int. Cl. G21c *19/32*

U.S. Cl. 176—37

2 Sheets Drawing. 14 Pages Specification

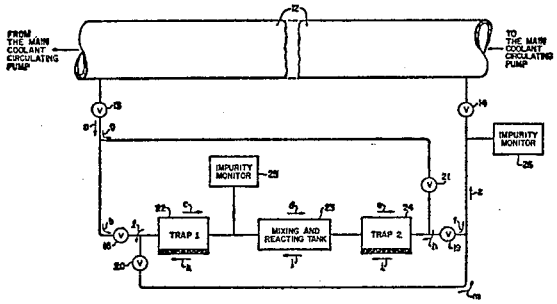

A system for removing radioactive fission products from a liquid metal reactor coolant. Isotopic diluents and reacting compounds are added to hot liquid sodium. The reactants isotopically exchange or chemically react with the fission products and are precipitated out of solution in a first cold trap. When the supply of reactants is exhausted, the flow is reversed; the first trap then functions to supply the reactants and the precipitation occurs in a second cold trap. The process operates continuously and reversibly.

REMOVAL OF RADIOACTIVE CONTAMINATION FROM A NUCLEAR REACTOR COOLANT

Filed Sept. 28, 1972 2 Sheets-Sheet 1